April 14, 1959  C. E. DYSART  2,881,539
FOOT GUARD

Filed Sept. 5, 1957 2 Sheets-Sheet 1

INVENTOR
CHARLES E. DYSART

BY *Harmon & Pierce*

ATTORNEYS

April 14, 1959
C. E. DYSART
2,881,539
FOOT GUARD
Filed Sept. 5, 1957
2 Sheets-Sheet 2
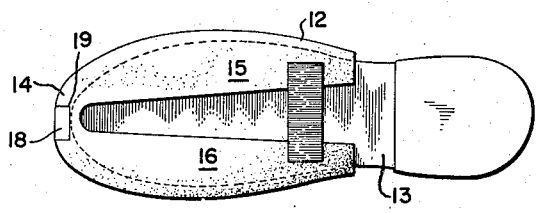
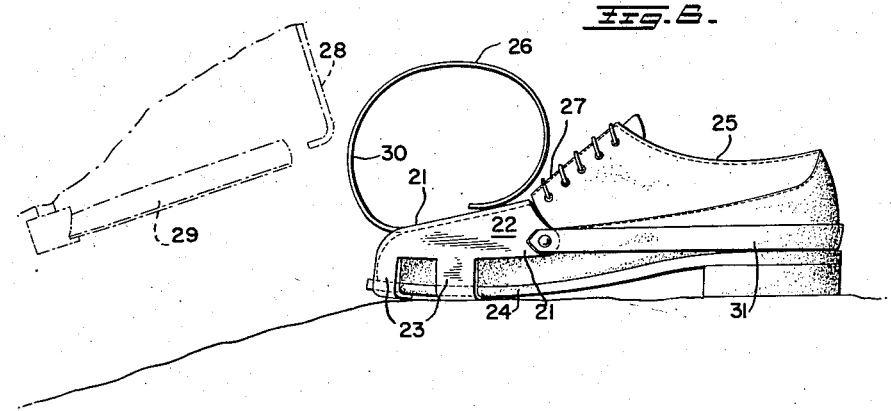
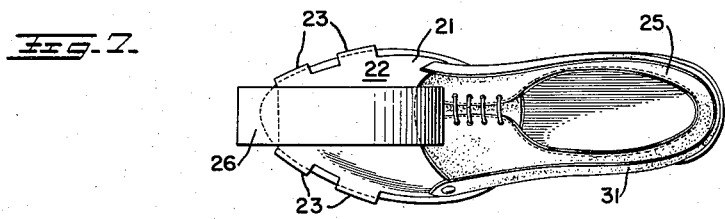
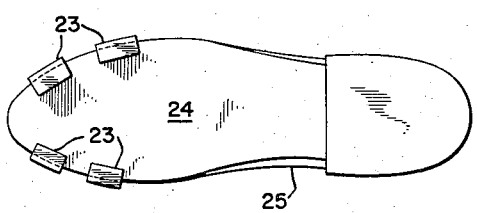
INVENTOR
CHARLES E. DYSART
BY *Harmon & Pierce*
ATTORNEYS

United States Patent Office 2,881,539
Patented Apr. 14, 1959

2,881,539
FOOT GUARD

Charles E. Dysart, Silver Spring, Md.

Application September 5, 1957, Serial No. 682,209

2 Claims. (Cl. 36—72)

This invention relates generally to foot guards and more specifically to guards for the feet to prevent injuries commonly occurring during power lawn mower operation.

The primary object of this invention is to provide a foot guard or bumper attachment for the shoes of a lawn mower operator which will prevent the operator's feet from entering under the skirt guard of a rotary type of lawn mower.

A more specific object of this invention is to provide a foot guard for the feet of a lawn mower operator which is readily attachable and detachable from street shoes and which is adaptable to usage over shoes of varied sizes.

Another object of this invention is to provide a foot guard for the feet of a lawn mower operator which has a toe portion of substantial height to engage the skirt of a power mower and thereby prevent the mower from running over the feet of the operator.

A still further object of this invention is to provide a light weight, low cost foot guard for the feet of a power mower operator which will be economical to manufacture.

With the foregoing and other objects in view the invention resides in the following specification and appended claims, certain embodiments and details of construction of which are illustrated in the accompanying drawings in which:

Figure 5 is a bottom plan view of the foot guard of Figure 3;

Figure 6 is a view in side elevation of another form of the foot guard comprising the invention applied to a shoe, and illustrates a portion of a rotary power mower in broken lines;

Figure 7 is a top plan view of the foot guard and shoe of Figure 6; and

Figure 8 is a bottom plan view of the foot guard and shoe of Figure 6.

One of the more prevalent types of injuries around the home in recent years has arisen with the increased use of the rotary type of power lawn mower. While most mowers of this type are provided with depending skirts to guard against injury, there is no inherent provision in such machines for rough or slippery turf which together with operator carelessness occasionally result in one or both feet of the operator entering the cutting zone of the mower by going under the skirt guard. These guards generally are suspended from the mower to a point in the range of one to three inches above the ground depending on adjustment. Since the power of the engine or electric motor driving the rotary blade is sufficient to maim the foot of an operator, it is highly desirable that a foot guard such as is provided by this invention be utilized to preclude the entrance of the foot into the mower cutting zone.

Figure 1:
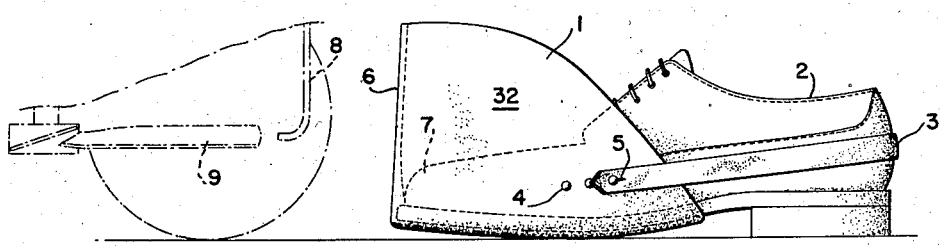
Figure 1 is a view of the preferred form of the foot guard comprising the invention in side elevation as applied to a shoe and illustrates in broken line form a portion of a rotary power mower.
Figure 2:
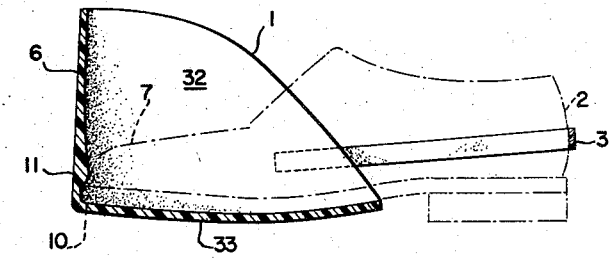
Figure 2 is a sectional view of the foot guard of Figure 1 with the shoe to which it is applied being illustrated in broken lines.

Referring now more particularly to Figures 1 and 2 a foot guard 1 is illustrated as being detachably secured to and partially encompassing a shoe 2 by means of an elastic strap 3. The strap 3 is secured to the guard 1 through the medium of buttons 4 and buttonhole 5. It is obvious that other securing means could readily be utilized. It is to be noted that the toe portion 6 and a substantial portion of side walls 32 of the guard 1 are substantially higher than the toe portion 7 of the shoe 2. It is preferable that the toe portion 6 and side walls 32 be greater than twice the height of the average shoe in order to make certain that there will be an engagement of the guard with the skirt 8 of the rotary mower. With such an engagement it is obvious that the shoe 2 cannot enter the cutting zone of the rotary blade 9 of the mower.

The guard 1 is preferably made of molded plastic material with the toe portion 6, side walls 32 and bottom wall 33 thereof being relatively rigid. In order to assist in keeping the guard 1 tightly engaged with the front edge of the sole 10 of the shoe 2 the toe portion 6 is provided with an inwardly directed lip 11. Thus by means of the strap 3 and the lip 11 the foot guard is firmly secured to the shoe 2.

Figure 3:
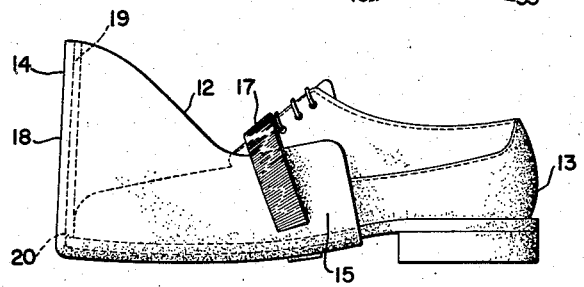
Figure 3 is a view in side elevation of a modified form of foot guard comprising the invention and being illustrated attached to a shoe.
Figure 4:
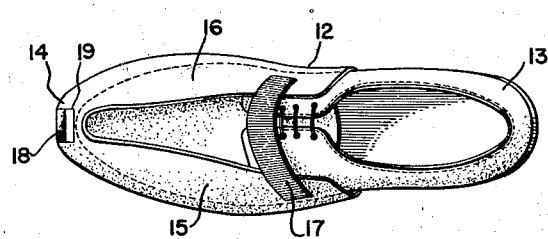
Figure 4 is a top plan view of the foot guard of Figure 3.

In the modified form of the invention illustrated in Figures 3, 4 and 5 a foot guard 12 is illustrated as applied to a shoe 13. The guard 12 is preferably molded of relatively flexible plastic or rubber material, and is of divided form top and bottom to make it adaptable to shoes of various widths. Thus the guard 12 is provided with an upstanding toe portion 14 of substantial height and rearwardly extending, shoe encompassing sections 15 and 16. The flexible ends of sections 15 and 16 are tightly held against shoe 13 by means of a flexible strap 17 which extends in threaded fashion through each section 15 and 16. The strap 17 may be incorporated with the guard 12 during manufacture or any other suitable type of strap might be utilized.

Integrally molded or otherwise secured within a recess 19 in the toe portion 14 of guard 12 is a rigid strip 18 preferably of metal. The strip 18 adds rigidity to the otherwise generally flexible guard and will upon engagement of the toe portion 14 with the skirt of a power mower prevent the shoe 13 from entering the mower cutting zone. Instead of providing the recess 19 for the strip 18, the strip may be integrally molded in the toe portion 14 during manufacture. Beneath the bottom portion of recess 19 in toe portion 14 a further transverse recess 20 is provided in the material to accommodate the front edge of the sole of shoe 13 and thereby act as an additional securing means for the guard 12.

In the modified form of Figures 6, 7 and 8, the high toe portion concept of the previously described forms is maintained and there is further provided an instep protecting feature. In this form of the invention the foot guard 21 is constructed of a single piece of stamped and formed metal. The metal is relatively springy in nature to accommodate different size shoes. A toe covering section 22 is provided with depending flanged lugs 23 which fit under the sole 24 of a shoe 25. Extended forwardly upwardly to a substantial height, and rearwardly in an arcuate fashion to a point of contact with toe section 22 is an integral relatively springy strip 26. This strip 26 guards the area from the toe of shoe 25 to the instep or lace section 27. Hence if the power mower should bounce and land over the toe, the skirt 28 of the mower will hit the strip 26 and prevent contact between the blade 29 and the toe. In normal function the forward edge 30 of the strip 26 will engage the skirt 28 of the mower to act as a bumper and thereby prevent the shoe 25 from entering the cutting zone. Any suitable securing means may be used to attach the guard 21 to the shoe 25. In the form illustrated a flexible strap 31 is utilized.

The prior art on foot guards was concerned with armoring the standard street shoe to prevent injuries arising from dropping heavy objects on the toes. None were concerned with the concept of preventing a foot from entering a danger zone. In the present invention it is this prevention that is important. A shoe armored with a guard attachment of the prior art would not prevent injury to the foot if subjected to the action of a rotary cutting blade on a power mower. Thus it is obvious that the invention provides a novel bumper or fender type of foot guard to prevent an operator's foot from entering the cutting zone of a rotary power mower.

While the invention is directed to the prevention of injuries while using rotary mowers, it is obvious that it would be equally useful with reel type mowers. It is likewise obvious that the invention may be subject to many structural modifications well within the purview of this invention and its claims. The prime feature of all such modifications including the ones illustrated herein is that the height of the toe portion of the foot guard must be substantially greater than the average street shoe to which it is applied.

I claim:

1. A foot guard for attachment to an ordinary street shoe to act as a bumper in engaging a guard skirt of a rotary power mower comprising a single piece of material having a relatively rigid toe portion which is at least twice the height of the toe portion of the shoe to which it is attached, a rearwardly extending bottom wall and relatively flexible side walls, the inner wall of the toe portion being provided with an inwardly directed lip, said lip with the bottom wall of the guard comprising a transverse recess to accommodate the front edge of the shoe sole and thereby assist in securing the guard in position on the shoe, and means attached to the side walls to detachably secure the guard to the shoe.

2. A foot guard for attachment to an ordinary street shoe to act as a bumper in engaging a guard skirt of a rotary power mower comprising a single piece of material having an upstanding toe portion which is at least twice the height of the toe portion of the shoe to which it is attached, a rearwardly extending bottom wall, and a pair of relatively flexible side walls extending rearwardly from the toe portion for substantially encompassing the shoe, said toe portion being provided with a recess extending vertically from the bottom wall thereof, a rigid piece of material secured in said recess and means attached to the side walls to secure the guard to the shoe.

References Cited in the file of this patent

UNITED STATES PATENTS

| | | |
|---|---|---|
| 477,255 | Jedlicka | June 21, 1892 |
| 754,673 | Mitchell | Mar. 15, 1904 |
| 756,198 | Adams | Apr. 5, 1904 |
| 1,317,427 | Carroll | Sept. 30, 1919 |
| 2,160,768 | Wasser | May 30, 1939 |
| 2,249,553 | Cataffo | July 15, 1941 |
| 2,373,596 | Popik | Apr. 10, 1945 |
| 2,392,867 | Stoner | Jan. 15, 1946 |
| 2,661,547 | Hyde | Dec. 8, 1953 |
| 2,807,098 | Wunker | Sept. 24, 1957 |

FOREIGN PATENTS

| | | |
|---|---|---|
| 648,206 | Great Britain | Jan. 3, 1951 |
| 830,013 | Germany | Jan. 31, 1952 |